(No Model.)
R. BOEKLEN.
PROCESS OF MANUFACTURING WATER GAS.
No. 378,490. Patented Feb. 28, 1888.
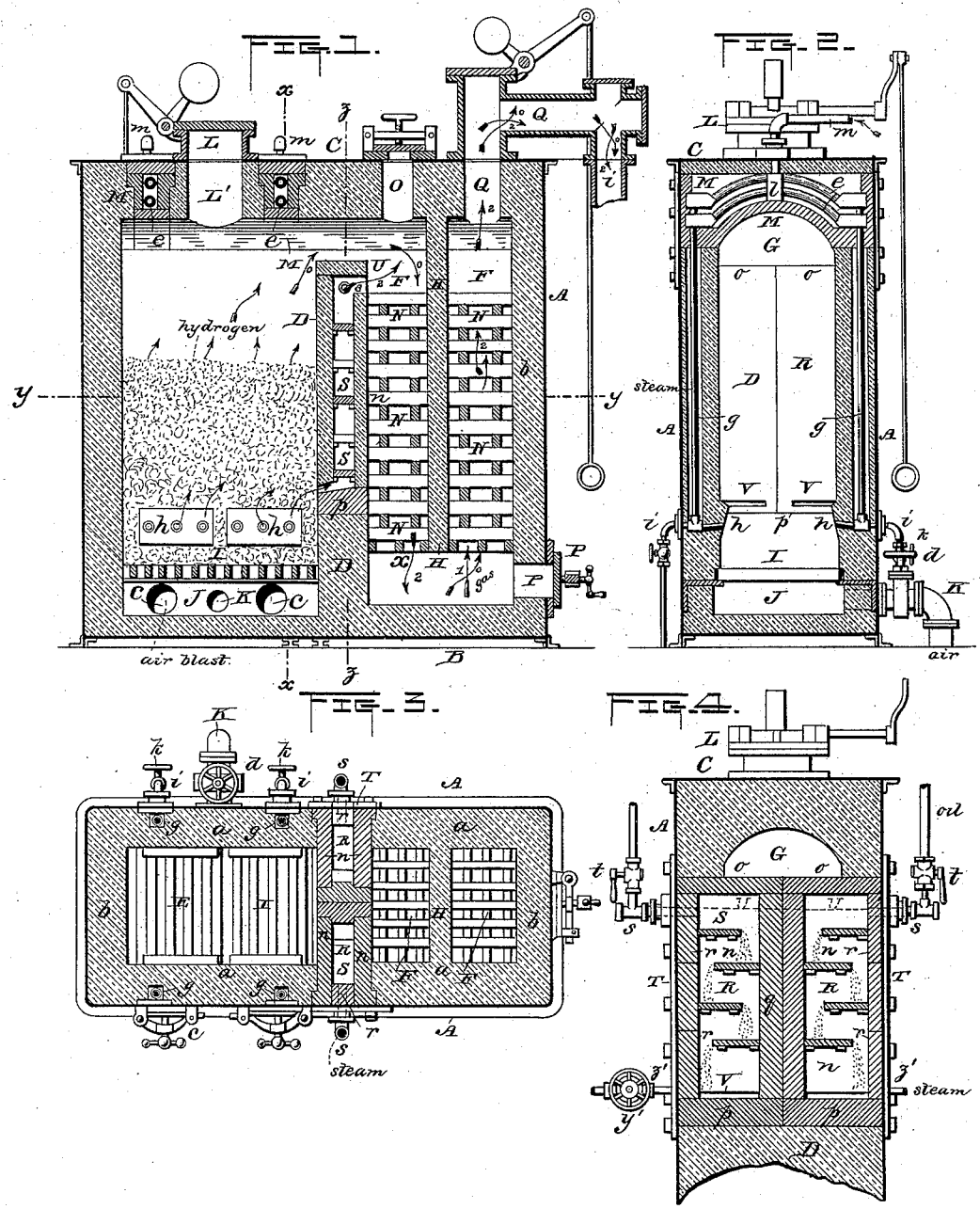
Witnesses
C. G. Conner, Jr.
H. E. Peck.
Inventor.
R. Boeklen.
per O. E. Duff,
Attorney.

UNITED STATES PATENT OFFICE.

REINHOLD BOEKLEN, OF BROOKLYN, NEW YORK.

PROCESS OF MANUFACTURING WATER=GAS.

SPECIFICATION forming part of Letters Patent No. 378,490, dated February 28, 1888.

Application filed March 26, 1887. Serial No. 232,508. (No specimens.)

*To all whom it may concern:*

Be it known that I, REINHOLD BOEKLEN, a citizen of the United States, residing at Brooklyn, in the county of Kings and State of New York, have invented certain new and useful Improvements in a Process of Generating Water-Gas; and I do hereby declare the following to be a full, clear, and exact description of the invention, such as will enable others skilled in the art to which it appertains to make and use the same.

My invention relates to a new and improved process of manufacturing illuminating-gas of a high candle-power.

The object of this invention is to effect a complete consumption of the crude oil, and also to utilize this crude oil more efficiently than heretofore.

To this end I have represented by the annexed drawings one practical mode of carrying my invention into effect; but I do not, as far as my process is concerned, confine myself to the precise instrumentalities for the accomplishment of my present process.

My invention relates particularly to that class of gas-generators in which steam is initially decomposed by contact with incandescent carbon, and the hydrogen and carbonic oxide gases generated by such decomposition utilized for illuminating and heating purposes.

In carrying out my invention a portion of the vapor of the water in a superheated condition passes into an oil-compartment, where free carbon is produced from the crude oil and in a high state of tenuity. In this chamber, which will be fully explained hereinafter, is caused a mixture of hydrogen and carbon gas. Just here in said chamber one part of my improved process commences—to wit, the free steam from the furnace proper commingles with the residuum and softens it, so that it will flow freely into the bed of incandescent fuel, where it will be utilized for the production of gas and heat in the said furnace. It will be observed that I employ what is technically termed a "bridge-wall" between the furnace proper and the fixing-compartment. This wall, being vertical and extending transversely across the generator, as described, is subjected to different temperatures, the highest part of it being coolest and the lowest part hottest, while gas-making. The hydrogen which is set free immediately combines with the gas from the oil, and the hydrogen which is still latent in vapor of water escapes through the perforation at the base of the vertical oil-gasifying retort. All of these highly-heated gases unite at one given point and commingle. From this point the gases pass down and upward through fixing-compartments, and finally unite in one common outlet.

The great feature of my improved process lies in this fact: that I retain the crude or heavy oil as long as possible to extract from it at a certain temperature nearly all of the carbon gas, and finally conduct the residuum back into the incandescent coal to be utilized for affording heat in the furnace and to be converted into gas, which will return to and commingle with the gases on their way to the fixing-chamber.

In the drawings hereto annexed, Figure 1 represents a longitudinal central vertical section of an apparatus adapted for conducting my improved process. Fig. 2 is a lateral vertical section of the same through the fuel-chamber, as indicated by dotted lines *x x*. Fig. 3 is a horizontal section of the apparatus as indicated by dotted line *y y* on Fig. 1. Fig. 4 is a vertical lateral section of the same, the section being taken through the oil-gas generator, in the line *z z*, Fig. 1.

The flow of steam is indicated by the arrows 1.

A represents the exterior sheet-metal case of an apparatus for conducting my improved process, which is preferably provided with a metal bottom, B, and a metal top, C. Said case is jointed with said top and bottom properly gas-tight and is suitably lined with fire tile and brick. Said lining of the case consists of a horizontal covering of the bottom B and straight vertical side walls, *a a*, at the longitudinal sides and walls *b b* at the ends of the case. The top of said lining is arched from one side, *a*, to the other, as shown in Figs. 1 and 2.

By means of a central vertical lateral partition or bridge wall, D, the fuel-chamber E is divided from the fixing-chamber F, except a portion near the top, and above said partition, between which a flue, G, connects both chambers, and by a central lateral vertical partition, H, the chamber F is divided from the top down within a short distance of the bottom of said chamber, at which point the divided portions of the same connect with one another.

The flow of the hydrogen is shown by the arrows o.

The fuel-chamber E has a suitable grate, I, and below it the ash-pit J, which latter has gas-tight-jointed doors c c, for removing the ashes, and connected with this ash-pit is the blast-pipe K, provided with a valve, d. The top of said fuel-chamber is furnished with the coal door or cover L over the opening L', through which the fuel or coal is discharged into the chamber. The said door is closed gas-tight during the gas-generating process, but is readily opened for blowing up the fire or charging coal.

Above the fuel-chamber are arranged the steam-superheaters M, consisting of the arched pipes e e, contained in the arched retorts f f. Said pipes e e each have a vertical pipe, g, connected, passing down in the lining of the sides a, to deliver into the steam-nozzles h, which discharge the superheated steam into the fuel-chamber a short distance above the grate of said chamber. Each of the nozzles h has a drip-pipe, i, on the outside of said chamber, connected with it for allowing the escape of the condensation of the steam from the nozzles h through the pipes e and g.

To stop or regulate the escape of steam and condensation, I provide each pipe i with a suitable regulating-valve, k. The central portions of the pipes e in each retort connect with a steam coupling or chamber, l, into which steam is furnished by means of a steam-pipe, m, connected with the steam-space of a steam-boiler and passing through a stuffing-box in the top of the fuel-chamber, as shown in Fig. 2.

Both compartments of the fixing-chamber F have resting upon suitable supports a number of cross-laid tiles, N, located one above the other, with spaces between them for a suitable retardation of the gas in passing through said compartments.

The compartment X, connected directly with the fuel-chamber, has a suitable opening covered with a gas-tight-jointed door, O, at its top for access for renewing and cleaning purposes.

The bottom of the chamber F, which connects both compartments, has also an opening and gas-tight door, P, for removing residues and ashes. The top of the compartment of said chamber F, separated from the fuel-chamber, is furnished with the opening and gas-outlet pipe Q, from which the fixed gases are delivered to the usual wash-box, and from it to the condenser, scrubber, and purifiers, and to the holder for consumption. The pipe Q has a cover, Q', to open for blowing up the fire.

The partition D is constructed hollow and with provision for generating the oil gas from crude oil for enriching the hydrogen generated in the fuel-chamber. Said partition D for this purpose is constructed of vertical adjoining retorts R R, which retorts rest upon the lower wall of said partition, and have intercepting lateral (nearly horizontal) shelves S S, and are removable from the apparatus, the shell of which has proper openings on opposite sides for the insertion of each retort, with a suitable cover, T, for each. Each retort has near its top a gas-outlet opening, U, into the adjoining compartment of the fixing-chamber. A small opening, V, is also provided at the bottom of the interior of each retort communicating with the fuel-chamber E. Each of said retorts is preferably built in separate tile-sections n n o p q r, and each of the tile-sections may be constructed of several subsections, the section o of each retort forming the top thereof, the section p the bottom, the sections n and n the lateral sides, the section q the inner side, and the section r the outer side of such retort. The oil in the retort is introduced through a pipe, s, from the outside of the cupola through its shell and near the side r at the top portion of the retort. Each pipe s is provided with a suitable valve, t, to regulate the flow of the oil. The shelves S are arranged in the retort with a space between each, over one another, as aforesaid, and alternately communicating with each other. The oil introduced at the top of the retort flows from shelf to shelf in a zigzag current, and the oil is decomposed, as stated. The gases generated from the oil pass through the top opening, U, into the adjoining compartment of the fixing-chamber F, and there, meeting and mixing with the hydrogen from the fuel-chamber, become fixed before escaping from the generator. The steam furnished from the nozzles h passes into the incandescent coal, and a portion of said steam passes into the bottom openings, V, of the retort, as shown by arrows f, to fluidize the oil residuum passing down the retort, the flow of the oil being shown by the arrows 2. When the temperature of the generator is reduced below the point necessary for the proper production of gas, the oil-supply and the steam-supply are cut off and the fuel-supply door L and the door Q' are opened, and in some cases the door O also is opened, so as to permit a direct draft through the furnace to heat the same. Now the blast is connected to revive the fire similar as in the operation of other alternate water-gas generators.

During the time when temperature of the fuel is very high, and also when required during the blast, a special supply of steam is furnished into the base of the oil-retorts by means of the steam-pipes z z. (Shown in Fig. 4.) The steam furnished through said pipes z z is regulated by the valves y.

Having described my improved process, I claim—

The process of manufacturing gas, which consists in gradually feeding the crude petroleum from the top downwardly within the furnace or retort, thereby subjecting it to successive degrees of heat as it gradually descends, eliminating the light vapors from the petroleum by subjecting the same to the heat of the retort, superheated steam, and gases resulting from the decomposition of the steam and oil by contact with the fuel, and passing said light vapors through a heated tile-fixing chamber, subjecting the residual petroleum to a body of incandescent fuel into which steam is delivered, said petroleum being delivered in proximity to said steam-delivery pipes, and then conducting the gases thus produced through said fixing-chamber simultaneously with the other gases.

In testimony whereof I affix my signature in presence of two witnesses.

REINHOLD BOEKLEN.

Witnesses:
WILLIAM FITCH,
GEORGE E. TEW.